(12) United States Patent
Masuda et al.

(10) Patent No.: US 12,011,994 B2
(45) Date of Patent: Jun. 18, 2024

(54) DRIVING APPARATUS

(71) Applicants: TOYOTA JIDOSHA KABUSHIKI KAISHA, Toyota (JP); AISIN CORPORATION, Kariya (JP)

(72) Inventors: Yuto Masuda, Toyota (JP); Yusuke Suzuki, Toyota (JP); Koichi Okuda, Toyota (JP); Toshihisa Mizutani, Kariya (JP); Taiki Owari, Kariya (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 0 days.

(21) Appl. No.: 18/347,066

(22) Filed: Jul. 5, 2023

(65) Prior Publication Data

US 2024/0017607 A1 Jan. 18, 2024

(30) Foreign Application Priority Data

Jul. 12, 2022 (JP) .................. 2022-111797

(51) Int. Cl.
| | |
|---|---|
| B60K 17/16 | (2006.01) |
| B60K 1/02 | (2006.01) |
| B60K 7/00 | (2006.01) |
| B60K 17/04 | (2006.01) |
| F16H 48/00 | (2012.01) |
| F16H 48/05 | (2012.01) |
| F16H 48/08 | (2006.01) |

(52) U.S. Cl.
CPC .............. *B60K 17/165* (2013.01); *B60K 1/02* (2013.01); *F16H 48/05* (2013.01); *F16H 2048/02* (2013.01); *F16H 2048/04* (2013.01); *F16H 2048/082* (2013.01)

(58) Field of Classification Search
CPC .......... B60K 1/02; B60K 17/14; B60K 17/16; B60K 17/145; B60K 17/165; F16H 48/05; F16H 48/08; F16H 2048/02; F16H 2048/04; F16H 2048/082
See application file for complete search history.

(56) References Cited

U.S. PATENT DOCUMENTS

| | | | | |
|---|---|---|---|---|
| 9,457,658 | B2 * | 10/2016 | Knoblauch | .......... B60L 15/2036 |
| 11,124,064 | B2 * | 9/2021 | Kaltenbach | .............. B60K 1/00 |
| 11,318,828 | B2 * | 5/2022 | Chopra | ................. B60B 35/122 |

(Continued)

FOREIGN PATENT DOCUMENTS

| | | | |
|---|---|---|---|
| CN | 112519491 A | * | 3/2021 |
| CN | 112519494 A | * | 3/2021 |

(Continued)

*Primary Examiner* — Tinh Dang
(74) *Attorney, Agent, or Firm* — Hunton Andrews Kurth LLP

(57) ABSTRACT

The driving apparatus comprising a first motor, a first gear mechanism having a first input shaft and a first output shaft connected to the first motor, a second motor, and a second gear mechanism having a second input shaft and a second output shaft connected to the second motor. The first gear mechanism is configured such that the first input shaft and the first output shaft are in an intersecting or twisted position, and the second gear mechanism is configured such that the second input shaft and the second output shaft are in an intersecting or twisted position.

4 Claims, 2 Drawing Sheets

(56) References Cited

U.S. PATENT DOCUMENTS

| | | | | |
|---|---|---|---|---|
| 2005/0023885 A1* | 2/2005 | Bennett | ................... | B60K 6/48 |
| | | | | 301/124.1 |
| 2008/0202826 A1 | 8/2008 | Freudenreich | | |
| 2015/0306955 A1* | 10/2015 | Knoblauch | .......... | B60K 17/356 |
| | | | | 180/242 |
| 2016/0221638 A1 | 8/2016 | Blasco Gracia et al. | | |
| 2018/0339695 A1* | 11/2018 | Kawahara | ............ | B60K 17/165 |
| 2021/0086612 A1* | 3/2021 | Imamura | ............. | B60K 17/346 |

FOREIGN PATENT DOCUMENTS

| | | | |
|---|---|---|---|
| DE | 102017216114 A1 * | 3/2019 | ........... B60H 1/3222 |
| DE | 102018204291 A1 | 9/2019 | |
| DE | 102020201291 A1 * | 8/2021 | |
| EP | 0010619 A1 | 5/1980 | |
| EP | 3109082 A1 | 12/2016 | |
| JP | 2016536186 A | 11/2016 | |
| JP | 2017094798 A | 6/2017 | |
| JP | 2019052690 A | 4/2019 | |
| WO | 2020167898 A1 | 8/2020 | |
| WO | 2020212054 A1 | 10/2020 | |

\* cited by examiner

DRIVING APPARATUS

CROSS-REFERENCE TO RELATED APPLICATIONS

The present disclosure claims priority to Japanese Patent Application No. 2022-111797 filed Jul. 12, 2022, which is incorporated herein by reference in its entirety including specification, drawings and claims.

TECHNICAL FIELD

This disclosure relates to a driving apparatus.

BACKGROUND

Conventional driving apparatuses of this type have been proposed with two motors that drive the left and right driving wheels independently and two reduction gears that decelerate the rotation of each motor and transmit the driving force to the driving wheels (see, for example, Patent Document 1). In this apparatus, the input shaft connected to each motor in the two reduction gears and the output shaft connected to the driving wheel side are arranged such that they are parallel to the vehicle in the lateral direction.

CITATION LIST

Patent Literature

PTL1: 2017-094798

SUMMARY

However, in the driving apparatus described above, since the two motors are arranged on the same axis, the shaft length of each motor becomes larger when the driving apparatus is designed to have higher output. As a result, the overall size of the driving apparatus increases in the lateral direction of the vehicle.

The main purpose of the driving apparatus of the present disclosure is to suppress the increase in the axial body size of the output shaft of the driving apparatus.

The driving apparatus of the present disclosure has adopted the following means to achieve the main objectives described above.

The driving apparatus of the present disclosure including a first motor, a first gear mechanism having a first input shaft and a first output shaft connected to the first motor, a second motor, and a second gear mechanism having a second input shaft and a second output shaft connected to the second motor; wherein the first gear mechanism is configured such that the first input shaft and the first output shaft are in an intersecting or twisted position; the second gear mechanism is configured such that the second input shaft and the second output shaft are in an intersecting or twisted position.

The driving apparatus of the present disclosure includes a first motor, a first gear mechanism with a first input shaft and a first output shaft connected to the first motor, a second motor, and a second gear mechanism with a second input shaft and a second output shaft connected to the second motor. The first gear mechanism is configured such that the first input shaft and the first output shaft are in an intersecting or twisted position, and the second gear mechanism is configured such that the second input shaft and the second output shaft are in an intersecting or twisted position. Configured such that the input and output shafts intersect means that the input and output shafts are located on the same plane and that the input shaft or its extension and the output shaft or its extension intersect. Configured such that the input and output shafts are in a twisted position means that the input and output shafts are not located on the same plane, and that when the input shaft is projected onto an appropriate plane that includes the output shaft, the projected input shaft or its extension and the output shaft or its extension intersect. One special example of "intersecting" includes "orthogonal," and the same is true for "intersecting" the projected input axis or its extension and the output axis or its extension in a torsional position.

In the driving apparatus of the present disclosure, by configuring the first gear mechanism and the second gear mechanism in this way, the axial body size of the two output shafts of the driving apparatus can be suppressed from becoming larger, even if the shaft lengths of the two motors become larger due to the higher output of the two motors.

DETAILED DESCRIPTION OF EMBODIMENTS

Figure 1:
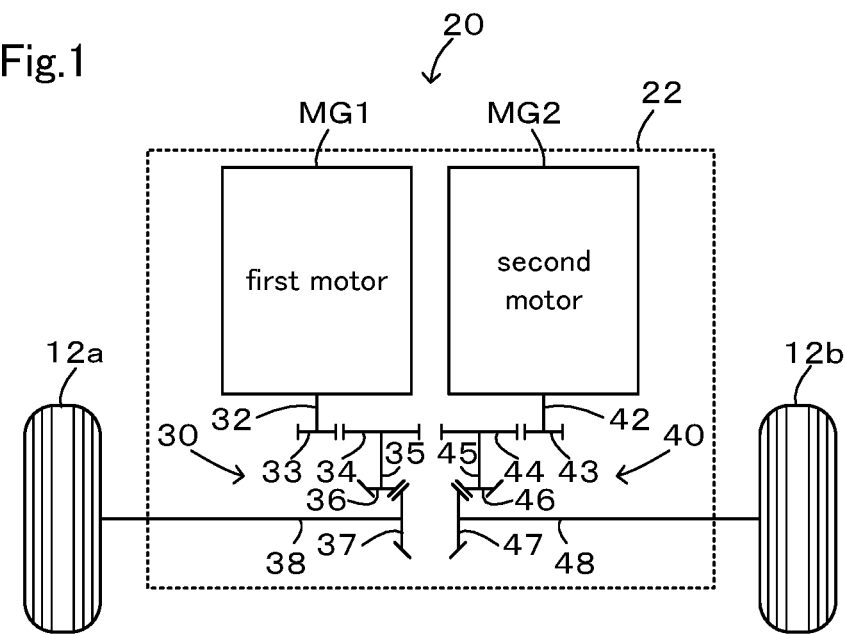
FIG. 1 shows a schematic configuration of the driving apparatus 20 as an embodiment of this disclosure.

Next, the embodiment of this disclosure will be described. FIG. 1 shows a schematic configuration of the driving apparatus 20 as an embodiment of this disclosure. The driving apparatus 20 of the embodiment may be mounted on a vehicle with the left and right front wheels as the drive wheels 12a, 12b, or on a vehicle with the left and right rear wheels as the drive wheels 12a, 12b. In the following embodiment, the upper part of FIG. 1 is an example of a case in which the driving apparatus 20 is attached to the left and right front driving wheels 12a, 12b at the front of the vehicle. The driving apparatus of the embodiment has the first motor MG1, the first gear mechanism 30, the second motor MG2, the second gear mechanism 40, and the housing case 22. The housing case 22 houses the first motor MG1, the first gear mechanism 30, the second motor MG2, and the second gear mechanism 40.

The first motor MG1 is configured as a synchronous generator motor, for example. The second motor MG2 is configured as the same synchronous generator motor as the first motor MG1. The first motor MG1 and the second motor MG2 are arranged such that the direction of the axis of rotation of each rotor is in the front-back direction of the vehicle and are mirror images of each other equally on both sides of the vehicle.

The first gear mechanism 30 has the first input shaft 32, the first counter shaft and the first output shaft 38. In the first gear mechanism 30, the first input shaft 32, the first counter shaft 35, and the first output shaft 38 are located on the same plane. The first input shaft 32 is connected at one end to the rotor of the first motor MG1 such that it is coaxial and is attached at the other end to the first gear 33. The first counter shaft 35 is attached at one end to the second gear 34 that meshes with the first gear 33. The first counter shaft 35 is attached at the other end to the third gear 36, which is configured as a bevel gear. The first output shaft 38 is connected at one end to the left drive wheel 12a. The first output shaft 38 is attached at the other end to the fourth gear 37, which is configured as a bevel gear that meshes with the third gear 36. The first counter shaft 35 and the first output shaft 38 are orthogonal (substantially orthogonal) because the third gear 36 and the fourth gear 37 are configured as bevel gears. Considering that the first input shaft 32, the first counter shaft 35, and the first output shaft 38 are located on the same plane and that the first input shaft 32 and the first counter shaft 35 are parallel, it is understood that the first input shaft 32 and the first output shaft 38 are orthogonal (substantially orthogonal). Here, two axes are orthogonal, meaning that one axis or its extension is orthogonal to the other axis or its extension. The first gear mechanism 30, with the first counter shaft 35, can transmit the speed of the first motor MG1 (speed of the first input shaft 32) to the first output shaft 38 at a reduced or increased speed.

The second gear mechanism 40 has the second input shaft 42, the second counter shaft 45, and the second output shaft 48. In the second gear mechanism 40, the second input shaft 42, the second counter shaft 45, and the second output shaft 48 are located on the same plane. The second input shaft 42 is coaxially connected at one end to the rotor of the second motor MG2 and is attached at the other end to the first gear 43. The second counter shaft 45 is attached at one end to the second gear 44 that meshes with the first gear 43. The second counter shaft 45 is attached at the other end to the third gear 46 configured as a bevel gear. The second output shaft 48 is connected at one end to the right drive wheel 12b. The second output shaft 48 is attached at the other end to the fourth gear 47, which is configured as a bevel gear that meshes with the third gear 46. The second counter shaft 45 and the second output shaft 48 are orthogonal (substantially orthogonal) because the third gear 46 and the fourth gear 47 are configured as bevel gears. Considering that the second input shaft 42, the second counter shaft 45, and the second output shaft 48 are located on the same plane and that the second input shaft 42 and the second counter shaft 45 are parallel, it is understood that the second input shaft 42 and the second output shaft 48 are orthogonal (substantially orthogonal). The second gear mechanism 40, with the second counter shaft 45, can transmit the speed of the second motor MG2 (speed of the second input shaft 42) to the second output shaft 48 at a reduced or increased speed. The second gear mechanism 40 has the same configuration as the first gear mechanism 30 and is arranged to be a mirror image of the first gear mechanism 30. Thus, the first output shaft 38 and the second output shaft 48 are coaxial.

The driving apparatus 20 of the embodiment is arranged such that the left side drive unit consisting of the first motor MG1 connected to the left drive wheel 12a and the first gear mechanism 30 and the right side drive unit consisting of the second motor MG2 connected to the right drive wheel 12b and the second gear mechanism 40 are symmetrical (mirror image).

In the driving apparatus 20 of the embodiment, lubricating oil for lubrication of the first gear mechanism 30 and the second gear mechanism 40 is stored in an oil pan (not shown), and the second gears 34, 44, the third gears 36, 46 and the fourth gears 37, 47 scrape lubricating oil from the oil pan. As a result, the driving apparatus 20 of the embodiment does not require an oil pump for lubrication.

The driving apparatus 20 of the embodiment can rotate the first output shaft 38 and the second output shaft 48 in the same direction by reversing the direction of rotation of the rotor of the first motor MG1 and the rotor of the second motor MG2. This allows the driving apparatus 20 of the embodiment to cancel out the effects of vibration and other effects caused by the rotation of the first motor MG1 by similar effects caused by the second motor MG2 when the vehicle is moving forward or backward. Also, in the same way, the effects of vibration and other effects caused by the rotation of the second motor MG2 can be canceled out by the similar effects of the first motor MG1. As a result, the vehicle ride quality can be improved.

In the driving apparatus 20 of the embodiment described above, the first motor MG1 and the second motor MG2 are arranged such that the direction of the axis of rotation of each rotor is in the front-back direction of the vehicle. The rotor of the first motor MG1 is connected such that it is coaxial with the first input shaft 32 of the first gear mechanism 30, and the first output shaft 38 of the first gear mechanism 30 is connected to the left drive wheel 12a. The rotor of the second motor MG2 is connected such that it is coaxial with the second input shaft 42 of the second gear mechanism 40, and the second output shaft 48 of the second gear mechanism 40 is connected to the right drive wheel 12b. In the first gear mechanism 30, the first input shaft 32 and the first output shaft 38 are positioned orthogonally (substantially orthogonal) to each other because the third gear 36 and the fourth gear 37 are configured as bevel gears. In the second gear mechanism 40, as in the first gear mechanism 30, the second input shaft 42 and the second output shaft 48 are positioned orthogonally (substantially orthogonal) to each other by configuring the third gear 46 and the fourth gear 47 as bevel gears. Therefore, when the shaft lengths of the first motor MG1 and the second motor MG2 are increased to increase the output power of the driving apparatus 20, the axial (vehicle front/rear) body sizes of the first input shaft 32 and the second input shaft 42 of the driving apparatus 20 become larger. However, the increase in the body size of the first output shaft 38 and the second output shaft 48 of the driving apparatus 20 in the axial direction (vehicle lateral direction) can be suppressed.

Figure 2:
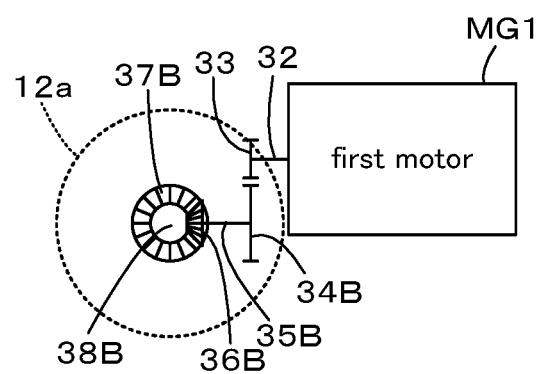
FIG. 2 shows an illustration of the left side driving section of the modified driving apparatus 20B, viewed laterally from the center of the vehicle.

In the driving apparatus 20 of the embodiment, the first gear mechanism 30 is configured such that the first input shaft 32 and the first output shaft 38 are orthogonal (substantially orthogonal) on the same plane and the second gear mechanism 40 is configured such that the second input shaft 42 and the second output shaft 48 are orthogonal (substantially orthogonal) on the same plane. However, as shown in the modified configuration in FIG. 2, the first gear mechanism 30B may be configured such that the first input shaft 32 and the first output shaft 38B are in a twisted position and the second gear mechanism 40B may be configured such that the second input shaft 42 and the second output shaft 48B are in a twisted position in the same manner as the first gear mechanism 30B. FIG. 2 shows an illustration of the left side driving section of the modified driving apparatus 20B, viewed laterally from the center of the vehicle. As shown in the figure, the second gear 34B is arranged to mesh with the first gear 33 on the vertical lower side of the first gear 33 attached to the first input shaft 32, and the fourth gear 37B configured as a bevel gear is arranged such that the other end of the counter shaft 35B of the second gear 34B meshes with the third gear 36B configured as a bevel gear. The axial direction of the first output shaft 38B is then in the front and back directions of the paper in FIG. 2, and the first input shaft 32 and the first output shaft 38B are in a twisted position. Here, "twisted position" means that the first input shaft 32 and the first output shaft 38B are not located on the same plane, and when the first input shaft 32 is projected onto a suitable plane that includes the second output shaft 48B, the projected first input shaft 32 or its extension and the second output shaft 48B or its extension intersect (in the embodiment orthogonal (substantially orthogonal)). In this modified driving apparatus the left side drive unit consisting of the first motor MG1 and the first gear mechanism 30B and the right side drive unit consisting of the second motor MG2 and the second gear mechanism 40B connected to the right drive wheel 12B are arranged to be symmetrical (mirror image). In this way, similar to the driving apparatus 20 of the embodiment, even if the shaft lengths of the first motor MG1 and the second motor MG2 are increased to achieve higher output, the increase in the body size of the first output shaft 38B and the second output shaft 48B of the driving apparatus 20B in the axial direction (vehicle transverse direction) can be suppressed. The driving apparatus 20B in the modified example also rotates the first output shaft 38B and the second output shaft 48B in the same direction by setting the direction of rotation of the rotor of the first motor MG1 and the second motor MG2 in opposite directions. This allows the effects of vibration and other factors caused by the rotation of the first motor MG1 and the second motor MG2 to cancel each other out when the vehicle is moving forward or backward.

Figure 3:
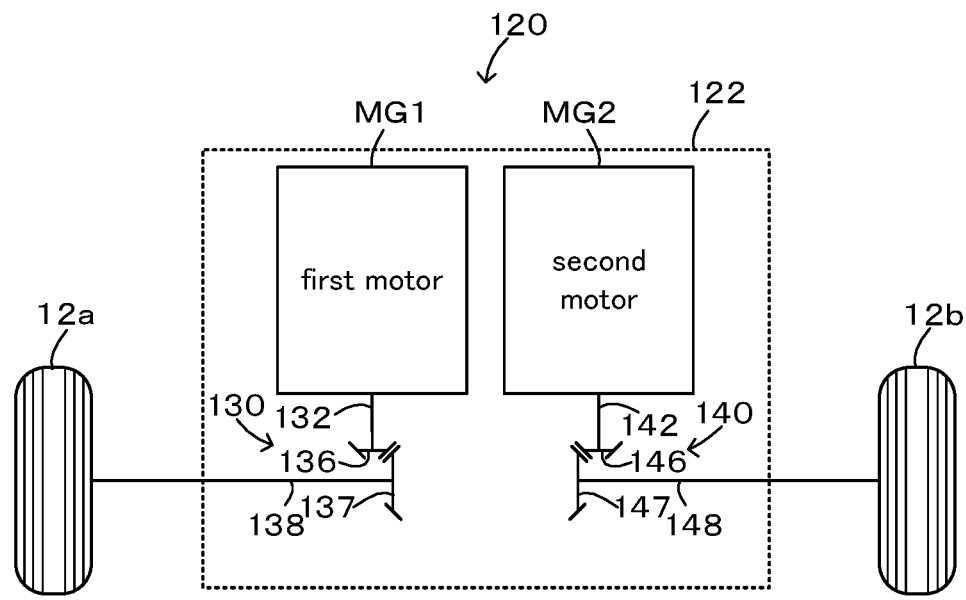
FIG. 3 shows a schematic configuration of the driving apparatus 120 of the modified example.

In the driving apparatus 20 of the embodiment, the first gear mechanism 30 has the first counter shaft 35 and the second gear mechanism 40 has the second counter shaft 45. However, as shown in the driving apparatus 120 in the modified configuration shown in FIG. 3, the first gear mechanism 130 and the second gear mechanism 140 may be configured so as not to have a counter shaft. That is, input side gears 136, 146 configured as bevel gears are attached to the first input shaft 132, the second input shaft 142 connected to the rotor of the first motor MG1 and the second motor MG2 such that they are coaxial. Then, the first gear mechanism 130 and the second gear mechanism 140 are configured such that the output side gears 137, 147 configured as bevel gears attached to the first output shaft 138 and the second output shaft 148 are meshed with the input side gears 136, 146. And the left side drive unit consisting of the first motor MG1 connected to the left drive wheel 12a and the first gear mechanism 130, and the right side drive unit consisting of the second motor MG2 connected to the right drive wheel 12b and the second gear mechanism 140 are arranged such that they are symmetrical (mirror image). Although the driving apparatus 120 of the modified example does not have the effect of having a counter shaft, it can achieve the same effect as the driving apparatus 20 of the embodiment.

Figure 4:
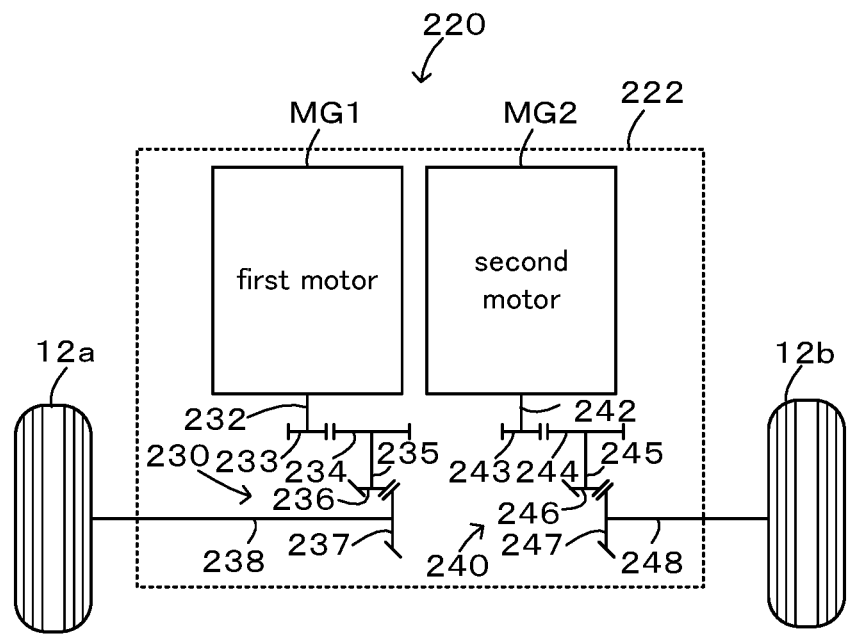
FIG. 4 shows a schematic configuration of the driving apparatus 220 of the modified example.

In the driving apparatus 20 of the embodiment, the left side drive unit consisting of the first motor MG1 connected to the left drive wheel 12a and the first gear mechanism 30, and the right side drive unit consisting of the second motor MG2 connected to the right drive wheel 12b and the second gear mechanism 40 are arranged to be symmetrical (mirror image). However, as shown in the driving apparatus 220 of the modified example in FIG. 4, the left side drive unit consisting of the first motor MG1 connected to the left drive wheel 12a and the first gear mechanism 230, and the right side drive unit consisting of the second motor MG2 connected to the right drive wheel 12b and the second gear mechanism 240, may be arranged in parallel in the same configuration. As shown in the figure, the first gear mechanism 230 is configured with the first input shaft 232, the first gear 233, the second gear 234, the first counter shaft 235, the third gear 236, the fourth gear 237, and the first output shaft 238 to be identical to the first gear mechanism 30 in the embodiment. The second gear mechanism 240 is configured as the same as the first gear mechanism 230: the second input shaft 242, the first gear 243, the second gear 244, the second counter shaft 245, the third gear 246, the fourth gear 247, and the second output shaft 248. Thus, by making the left side drive unit and the right side drive unit identical, the number of components comprising the driving apparatus 220 can be reduced. In the driving apparatus 220 of the modified example, the direction of rotation of the output shaft 238 is the same as that of the output shaft 248 when the direction of rotation of the rotor of the first motor MG1 is the same as that of the rotor of the second motor MG2. Therefore, the same effects can be achieved as in the driving apparatus 20 of the embodiment, except for the effect that the effects of vibration and the like caused by the rotation of the first motor MG1 and the second motor MG2 can be cancelled each other out.

The driving apparatus 20 of the embodiment has the left side drive unit consisting of the first motor MG1 connected to the left drive wheel 12a and the first gear mechanism 30, and the right side drive unit consisting of the second motor MG2 connected to the right drive wheel 12b and the second gear mechanism 40. However, in addition to these, it may be equipped with one or more drive units consisting of the third motor and the third gear mechanism.

The driving apparatus 20 of the embodiment has the left side drive unit consisting of the first motor MG1 connected to the left drive wheel 12a and the first gear mechanism 30, and the right side drive unit consisting of the second motor MG2 connected to the right drive wheel 12b and the second gear mechanism 40. However, it may be configured as the driving apparatus with the front drive unit consisting of the first motor and the first gear mechanism connected to the front drive wheel and the rear drive unit consisting of the second motor and the second gear mechanism connected to the rear drive wheel, since the input and output shafts of the two gear mechanisms connected to the two motors can be in an orthogonal (substantially orthogonal) or twisted position.

In the driving apparatus of the present disclosure, the first gear mechanism and the second gear mechanism may be arranged such that the first input shaft and the second input shaft are parallel and the first output shaft and the second output shaft are on the same axis. By mounting the driving apparatus in the vehicle such that the first output shaft and the second output shaft are connected to the left and right drive wheels, respectively, the lateral body size of the driving apparatus in the vehicle can be reduced even if the shaft length of the motors is increased to achieve higher output of the two motors. In this case, the first gear mechanism and the second gear mechanism may be configured such that the direction of rotation of the first output shaft is the same as that of the second output shaft when the direction of rotation of the first input shaft is different from that of the second input shaft. In this way, the effect of the rotation of the first motor can be counteracted by the effect of the rotation of the second motor, and the driving apparatus can provide a good ride quality when mounted in the vehicle. In these cases, the driving apparatus may have a housing case for a single unit that houses the first motor, the second motor, the first gear mechanism, and the second gear mechanism. In this way, the driving apparatus can be easily mounted on a vehicle or other equipment.

The following is an explanation of the correspondence between the main elements of the embodiment and the main elements of the disclosure described in the section on means to solve the problem. In the embodiment, the first motor MG1 corresponds to the "first motor," the first gear mechanism 30 corresponds to the "first gear mechanism," the second motor MG2 corresponds to the "second motor," and the second gear mechanism 40 corresponds to the "second gear mechanism".

The correspondence between the major elements of the embodiment and the major elements of the disclosure described in the means to solve a problem section is an example of how the embodiment can be used to specifically explain the embodiment of the disclosure described in the means to solve a problem section. This does not limit the elements of the disclosure described in the means to solve the problem section. In other words, interpretation of the disclosure described in the means to solve a problem section should be based on the description in that section, and the embodiment is only one specific example of the disclosure described in the means to solve a problem section.

The above is a description of the form for implementing this disclosure using the embodiment. However, the present disclosure is not limited in any way to these embodiments, and can of course be implemented in various forms within the scope that does not depart from the gist of the present disclosure.

INDUSTRIAL APPLICABILITY

This disclosure is applicable to the driving apparatus manufacturing industry.

The invention claimed is:

1. A driving apparatus, comprising:
   a first motor;
   a first gear mechanism having a first input shaft and a first output shaft, the first input shaft being connected to the first motor;
   a second motor; and
   a second gear mechanism having a second input shaft and a second output shaft, the second input shaft being connected to the second motor,
   wherein
   the first gear mechanism is configured such that the first input shaft and the first output shaft are in an intersecting or twisted position;
   the second gear mechanism is configured such that the second input shaft and the second output shaft are in an intersecting or twisted position, and
   the first gear mechanism and the second gear mechanism are configured such that the direction of rotation of the first output shaft is the same as the direction of rotation of the second output shaft when the direction of rotation of the first input shaft is different from the direction of rotation of the second input shaft.

2. The driving apparatus according to claim 1, wherein the first gear mechanism and the second gear mechanism are arranged such that the first input shaft and the second input shaft are parallel and the first output shaft and the second output shaft are on the same axis.

3. The driving apparatus according to claim 2, wherein the driving apparatus has a housing case for a single unit that houses the first motor, the second motor, the first gear mechanism, and the second gear mechanism.

4. The driving apparatus according to claim 1, wherein the driving apparatus has a housing case for a single unit that houses the first motor, the second motor, the first gear mechanism, and the second gear mechanism.

* * * * *